Aug. 25, 1953 A. W. KONCHAN 2,649,987
RADIATOR PRESSURE CAP
Filed March 15, 1951
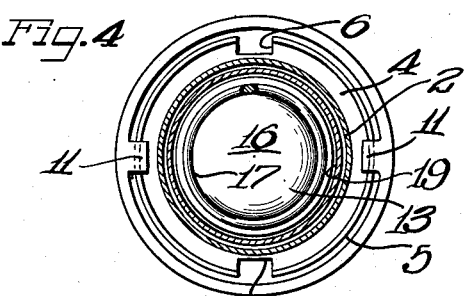
Fig.4
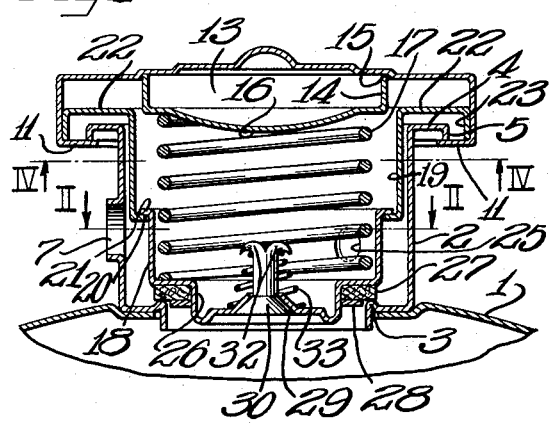
Fig.1
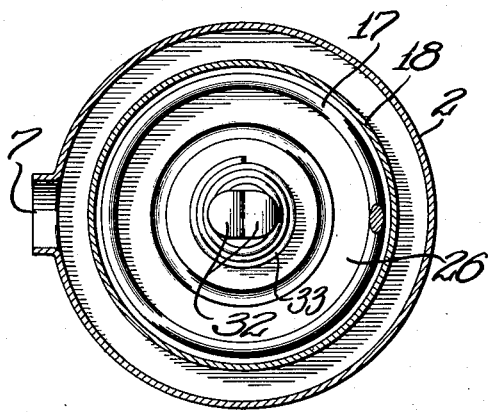
Fig.2
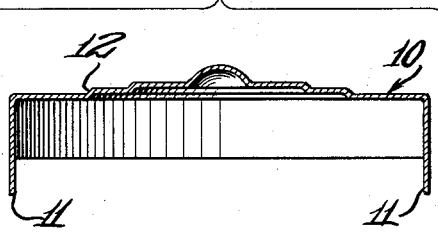
Fig.3
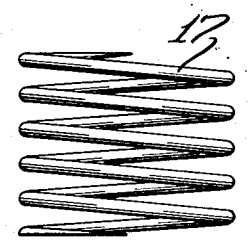
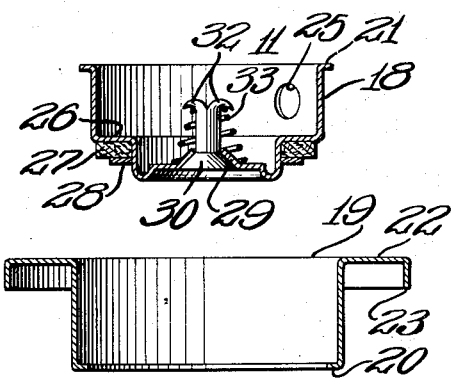
Inventor:
Anton W. Konchan
by Hill, Sherman, Meroni, Gross & Simpson
Attys Patented Aug. 25, 1953

2,649,987

UNITED STATES PATENT OFFICE 2,649,987

RADIATOR PRESSURE CAP

Anton W. Konchan, Berwyn, Ill.

Application March 15, 1951, Serial No. 215,794

1 Claim. (Cl. 220—44)

This invention relates to an automobile radiator cap and more particularly to a detachable self-locking cap having both pressure and vacuum relief valves embodied therein.

An object of this invention is to provide an improved pressure type radiator cap which lends itself to economical manufacture on a large production scale.

Another object of this invention is to provide a pressure type cap wherein the major cap parts may be made from simple metallic stampings.

Yet another object of this invention is to provide an improved pressure type radiator cap which is simple in construction and of a minimum of parts.

A further object of the invention is to provide a pressure cap assembly wherein the sealing gasket for engaging the edge of the neck filler opening of the radiator may be used as a movable pressure relief valve when the cap is locked to the neck.

In accordance with the general features of this invention there are provided oppositely dished cap and cage members with interengaging flanges for detachable locking engagement with the outer end of a radiator neck, the cage member telescoping the neck and having a sealing gasket for interengagement with the shoulder inside the neck defining the filler opening of the radiator. A spring inside the cage acts at all times to separate the cage and cap members and to force the inside end of the cage member into sealing engagement with the neck shoulder; this spring being calibrated so that when the cap is in locked position, excessive pressure in the radiator can overcome the same and unseat the cage member from said shoulder to relieve such pressure.

Another feature of the invention relates to making the depending valve cage of the cap of two stampings having its major parts held in interlocking engagement by the same spring as is used to seal the gasket against the shoulder in the radiator neck.

Other objects and features of this invention will more fully appear from the following detailed description taken in connection with the accompanying drawings which illustrate a single embodiment thereof and in which:

Figure 1 is a vertical fragmentary sectional view through the pressure cap of my invention showing it applied and locked to the neck of a radiator and in sealing engaged with a shoulder inside the neck;

Figure 2 is a cross-sectional view taken on substantially the line II—II of Figure 1, looking downwardly;

Figure 3 is an exploded view partly in section and partly in construction showing the various parts going to make up my novel pressure cap; and Figure 4 is a view taken on the line IV—IV of Figure 1, looking upwardly showing a locking means for locking the cap to the outer edge of the radiator neck.

As shown on the drawings:

The reference character 1 designates generally an automobile radiator having secured to it a neck or spout 2 which at its point of juncture with the radiator has an inclined shoulder 3 which defines the filler opening for the radiator.

The outer end of the neck 2 has a laterally turned flange 4 terminating in a turned edge 5, which has diametrically opposite notches or slots 6 of the usual construction for use in the bayonet locking of a radiator cap to the member (Figure 4).

In addition the neck 2 is provided with a conventional overflow opening 7 through which a fluid, such as steam, which is vented thru the cap from the radiator may escape.

Now in Figure 3 I have shown, in exploded form, the various parts or components of my novel radiator pressure cap, including a dished outer cap body 10 having diametrically opposite locking ears 11 adapted to be turned radially inward as shown in Figure 1 when the parts are assembled together for holding the parts together. In addition these ears 11 serve as locking ears adapted to pass through slots 6—6 of the neck flange as the cap is brought downwardly on the neck so that upon turning of the cap these ears can be engaged under and locked to the neck edge 5.

In addition the top of the cap body 10 has an independent shoulder 12 cooperable with an edge 15 on a flange 14 of a cupped portion 13. It will be noted that both this portion 13 and the cap body 10 may be made from simple metallic stampings.

In addition the portion 13 has a downward bulge 16 adapted to enter the upper end of a compression coil spring 17, the lower end of which is adapted, in the assembly of the parts, to telescope a lower section or portion 18. This section 18 is dished in an opposite direction from that of the cap body 10 or in other words downwardly.

Another section of my cage comprises a metallic stamping 19 having a lower turned edge 20 of such diameter as to engage edge 21 of dished section 18 when it is assembled upwardly around section 18. As shall become more apparent hereinafter, the engagement of the two edges 20 and 21 of cage sections or portions 18 and 19 is maintained by the compression spring 17.

By making the valve cage, which depends from the cap body, of two sections, I find that I am able to use simple stampings which do not require draws as deep as that which would be required if the cage were made from one piece of metal.

It will be noted from the bottom of Figure 3 that the cage section 19, which becomes the upper section when the parts are assembled, has a laterally turned flange 22 terminating in a turned edge 23 adapted to slidably fit inside of the cap body 10 (Figure 1). Also it should be noted that this turned edge 23 is held in the cap by the locking ears 11—11 which thus perform two functions in my cap.

I also contemplate providing the cage section 18 with a vent hole 25 in communication with the atmosphere and for use in connection with the suction relief valve to be described hereinafter.

The lower dished cage section 18 has a flange shoulder 26 in which is tightly fitted a resilient sealing gasket 27. This gasket may be held on the section 18 by a retainer or washer 28 press fitted over the lower end of the section 18 which, however, leaves exposed the peripheral or effective portion of the sealing gasket.

In addition section 18, centrally of the flange shoulder 26 and concentric therewith, has a frusto-conical valve seat 29 apertured at its center to provide a valve opening. Cooperable with this section is a frusto-conical suction relief valve 30, the shank 31 of which extends upwardly and terminates in oppositely flaring ears 32. Positioned between these ears 32 and the frusto-conical valve seat 29 is a compression spring 33 which at all times urges the valve to its closed position. The spring 33 is so calibrated that upon a development of a sub-atmospheric or vacuum condition in the radiator, it will be overcome by atmosphere pressure thereby resulting in the opening of the valve.

After the parts of my pressure cap have been assembled as shown in Figure 1, the ears 11—11 of the cap body are turned under the edge 23 of the upper section of the cage thereby locking the cage to the cap in a downward depending position. In this position the spring forces the lower section 18 downward so that its edge 21 is tightly interengaged with the turned edge 20 of the upper section.

Now when the cap is applied to the neck 2, the ears 11—11 are first aligned with slots 6—6 in the neck edge so that they can pass therethrough and upon turning of the cap will thereafter engage under edge 5 of the neck in locked interengagement therein. In the course of this locking action the spring 17 forces the cap body 10 outward and the two section cage downward thereby accomplishing three things, namely, (1) to tighten the locking engagement between the cap and the neck, (2) to tighten the interengagement between the turned edges 20 and 21 of the sections and (3) to force the resilient gasket 27 into sealing engagement with the shoulder 3 about the filler opening in the radiator.

Should excessive pressures develop in the radiator over and beyond the pressure which the spring 17 is calibrated to apply, such pressure will move the lower section 18 upwardly, unseating the gasket and venting the radiator. The sealing gasket 27 not only serves as a sealing ring for the filler opening but it also performs the function of a movable valve member for relieving excessive pressures in the radiator. Its operation, however, is entirely independent of that of the vacuum relief valve 30 which has its own independent spring 33 for spring loading it.

The spring 17 is at all times maintained in properly centered position by the boss 16 on cup element 13 which is in turn engaged with the inside of the cap body 10.

I claim as my invention:

A radiator pressure cap apparatus, comprising, means providing an annular valve seat and a housing, a movable valve member in said housing consisting of an integral cup shaped stamping having an outturned edge and having first and second body portions of different sized cylindrical configurations joined by a radial annular flange, an annular sealing gasket retained on said second body portion and abutting one face of said radial flange, said second body portion extending through said annular valve seat and being closed by a radially inwardly extending wall having formed therein an apertured conically shaped valve seat seating a complementary conical spring-biased normally-closed venting valve, and a spring in said housing bottomed against the opposite face of said flange and clamping said radial flange and said sealing gasket against said annular valve seat, whereby said movable valve member unseats to relieve excess pressures and said conical venting valve unseats to relieve negative pressures.

ANTON W. KONCHAN.

References Cited in the file of this patent

UNITED STATES PATENTS

| Number | Name | Date |
|---|---|---|
| 2,164,450 | Eshbaugh et al. | July 4, 1939 |
| 2,191,614 | Frantz | Feb. 27, 1940 |
| 2,266,314 | Eshbaugh | Dec. 16, 1941 |
| 2,521,201 | Clark et al. | Sept. 5, 1950 |